April 6, 1926.

P. H. MacNEILL

ROTARY ENGINE

Filed Nov. 15, 1923

Inventor,
Ora MacNeill
Executrix of the Estate of
Paul H. MacNeill, deceased
By Frank R. Gore Atty.

April 6, 1926.                 P. H. MacNEILL                 1,579,226
                                ROTARY ENGINE
                              Filed Nov. 15, 1923            4 Sheets-Sheet 4

Inventor,
Ora MacNeill
Executrix of the Estate of
Paul H. MacNeill, deceased
By Frank R. Gore
                    Atty.

Patented Apr. 6, 1926.

1,579,226

UNITED STATES PATENT OFFICE.

PAUL H. MacNEILL, DECEASED, LATE OF EVANSVILLE, INDIANA; BY ORA MacNEILL, EXECUTRIX, OF CANNELTON, INDIANA, ASSIGNOR, BY DIRECT AND MESNE ASSIGNMENTS, OF ONE-FOURTH TO HENRY R. CARROLL AND ONE-FOURTH TO JOHN W. PHARES, OF VANDERBURG COUNTY, INDIANA.

ROTARY ENGINE.

Application filed November 15, 1923. Serial No. 674,926.

*To all whom it may concern:*

Be it known that PAUL H. MacNEILL, deceased, late a citizen of the United States, residing at Evansville, in the county of Vanderburg and State of Indiana, invented certain new and useful Improvements in Rotary Engines, of which the following is a specification.

This invention relates to rotary engines and, while set forth as a rotary steam engine, is adapted for use, with slight modifications, as an internal combustion engine, or, as a pump.

The object of my invention is to provide an improved rotary engine wherein all of the parts will have a rotary movement and there will be, at every part of the revolution of the rotors, a positive confinement of the gases and the utilization of expansion of the gases.

My improvements entirely eliminate the use of sliding or reciprocating abutments whether carried by the rotor or by the casing or cylinder in which the rotor revolves, thus eliminating defects due to the employment of such devices.

The present invention has more particular reference to that general class of rotary engine employing a rotor having vanes adapted to enter pockets in rotary abutment drums which are so timed as to cause the vanes to enter the pockets at the proper times, the drums at other times bearing on the rotor and sealing the steam cavities so that the steam may be used both directly and expansively. In this type of rotary engine, the machining of the parts must be accurate but the wear on the parts is minimum.

My improvements relate, more particularly, first, to the construction of each rotor; second, to the combination of each rotor with steam chambers which, respectively, are used to cause revolution of the rotor in one direction or the other; third, the combination of a plurality of rotors of improved construction, with steam chambers for the admission of steam to cause them to revolve in one direction and with a chamber common to both of them from which steam may be admitted to both to cause the rotors to revolve in the opposite direction; fourth, to the combination of a novel form of rotor with abutment drums, a rotor cylinder or casing, and special arrangement of exhaust ports; fifth, to a unit system of steam casings, rotor casings or cylinders, rotors, and abutment drums detachably connected in such manner that the units may be assembled or disconnected without difficulty for purposes of inspection or repairs.

It will be understood that while the invention is described, and is shown in the accompanying drawings, as embodied in a rotary steam engine, it is within the principles thereof to embody it in either a rotary internal combustion engine, or, in a pump, and in claiming the invention it is to be understood that all of these types are intended to be covered.

Figure 1:
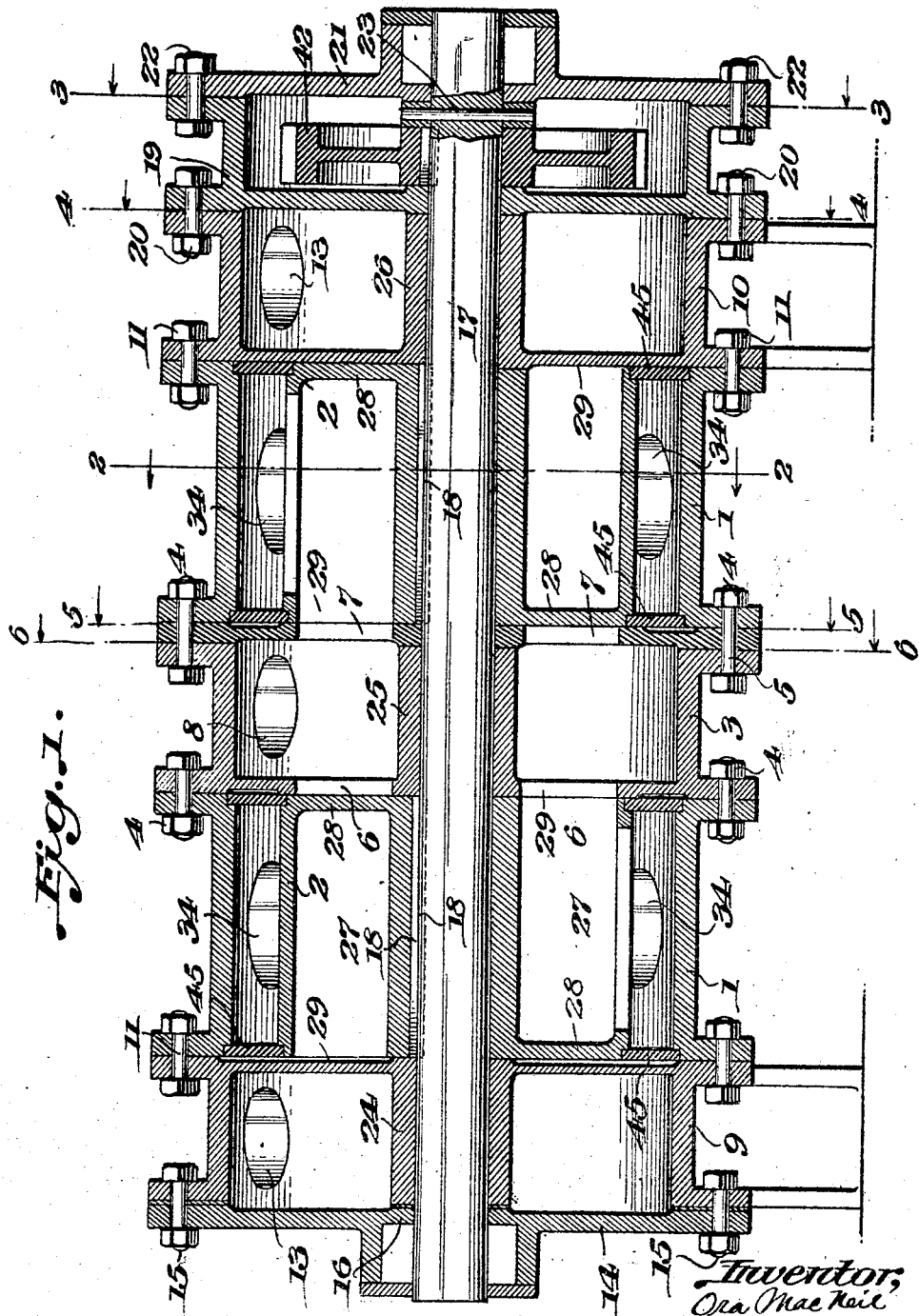
Figure 1 is a longitudinal section on the line 1—1 of Fig. 2.

Referring to Fig. 1, there is illustrated a rotary steam engine having but two steam cylinders or casings 1 and two rotors 2. It will be understood, however, that as the engine is of unit construction, other cylinders and additional rotors could be added.

Figure 5:
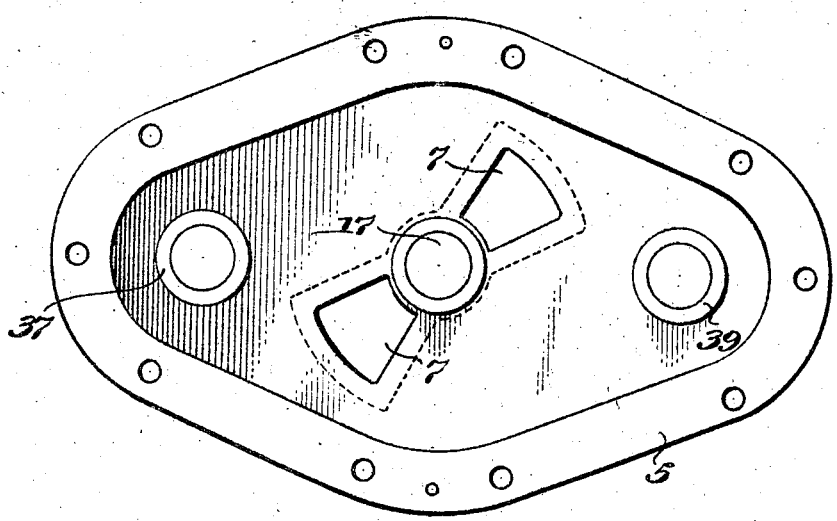
Fig. 5 is an end elevation of one of the plates interposed between one of the rotor cylinders and the adjoining steam casing or diaphragm taken on the line 5—5, Fig. 1.
Figure 6:
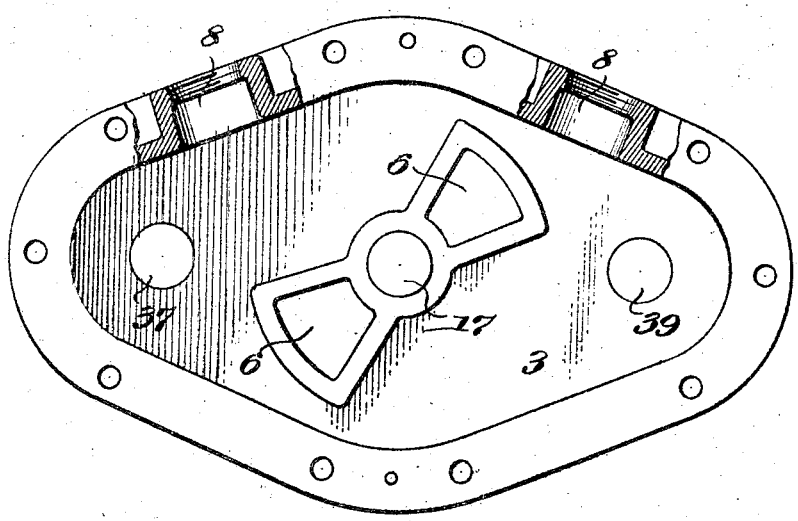
Fig. 6 is an end elevation of the central steam chamber or diaphragm taken on the line 6—6, Fig. 1.

Interposed between the cylinders 1 is a steam chest 3 which is directly bolted at 4 to one of the cylinders 1 and is bolted to the other cylinder 1 by similar bolts but there is interposed between the flanges of the chest 3 and the said last named cylinder 1, a plate 5 (Fig. 5). Thus, the chest 3 has side walls separating it from the cylinders 1. These side walls are provided with ports 6, 7, which are arranged directly opposite each other longitudinally of the engine and are of the same size so that if steam be admitted to the chest 3, it will flow to the rotors 2 and the cut-off action of said rotors in relation to said ports will occur at the same time and to corresponding degree but, as will presently be seen, one port 6 and one port 7 are open while the remaining ports 6, 7, are closed.

Steam is admitted, under any desired valve control, to the chest 3 through pipe connections leading to suitable inlet ports 8.

Figure 4:
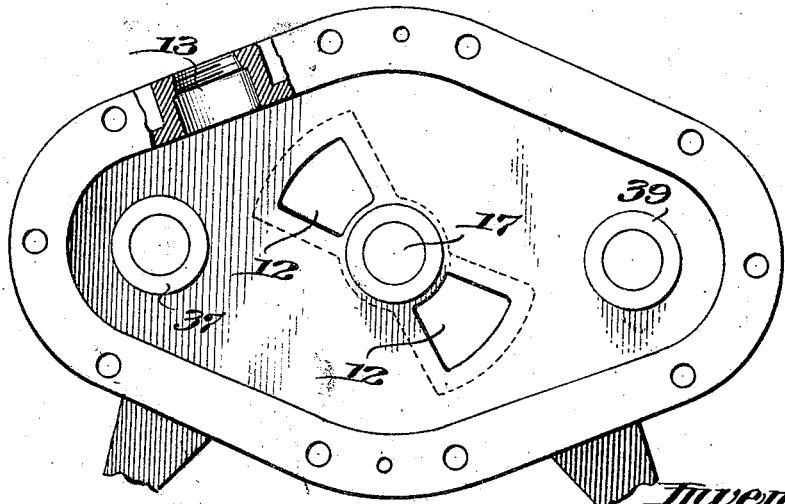
Fig. 4 is an end elevation of one of the steam chambers taken on the line 4—4, Fig. 1.

Steam chests 9, 10, such as shown in Figs. 1 and 4, are bolted to the other ends of the cylinders 1, by suitable bolts 11 and they are provided with walls adjacent the cylinders 1, said walls being closed except for the provision of ports 12, Fig. 4, which are arranged diametrically opposite each other, in each instance, (as with the ports 6, 6; 7, 7) but the ports 12 are set quadrants distances apart from the arrangement of the ports 6, 6; 7, 7. The ports 12, 12, in the walls of the steam chests 9, 10, are, respectively, in longitudinal alinement. Therefore, steam flows from chests 9, 10, to rotors 2, 2, and the cut off is the same.

As ports 12, 12, are set quartering in relation to the ports 6, 6; 7, 7, the rotors 2 will revolve in one direction when steam is admitted to the chest 3 and cut off from the chests 9 and 10 and will revolve in the opposite direction when the steam is cut off from chest 3 and admitted to chests 9 and 10. The chests 9 and 10 are provided with steam admission ports 13 (Figs. 1 and 4), supplied in any suitable manner under any suitable valve control.

The chest 9 is closed at its outer face by a plate 14 connected to it by bolts 15 and provided with a suitable bearing 16 for the shaft 17 to which the rotors 2, 2, are suitably keyed at 18.

The outer face of the chest 10 is covered by a gear case 19 bolted thereto at 20. A bearing cover plate 21 is bolted to the case 19 at 22 and has a bearing 23 for the shaft 17. Bearings 24, 25, 26, carried by the chests 9, 3 and 10, also support the shaft 17.

The rotors 2 are of similar construction, each being in the form of a drum provided with a plurality of longitudinally extending compartments 27 which, in the disclosed embodiment, are six in number. These compartments are each closed at one end by an end wall 28, the opposite end of the compartments being open at 29. Successive compartments 27 (considered circumferentially of the rotor) are opened and closed alternately at each end of the rotor; that is to say, considering the left hand end of the rotor, one compartment is open, the next one is closed, the third one is open, the fourth one closed, etc. This is also true of the right hand end. The compartments 27 all communicate with the interior of the cylinder 1, by ports 30, 31, so that steam admitted to the compartments 27 from the steam chest (3, or 9, or 10) immediately flows through the ports 30, 31 into the cylinder 1 to be used both directly and expansively, as will presently appear, on the vanes 32 for the purpose of turning the rotor until the proper point has been reached where exhaust of the steam in the cavities 33 should occur whereupon such exhaust is effected through the exhaust ports 34. There are four exhaust ports for each cylinder 1, that is, eight for both cylinders. The two exhaust ports nearest the point of intake, 30, 31, determined by the direction the engine revolves, are closed and the actual exhaust takes place at a point as far as possible from the intake and as close as possible to the point where the rotor vane 32 will pass the side abutment drum, now to be described.

Figure 2:
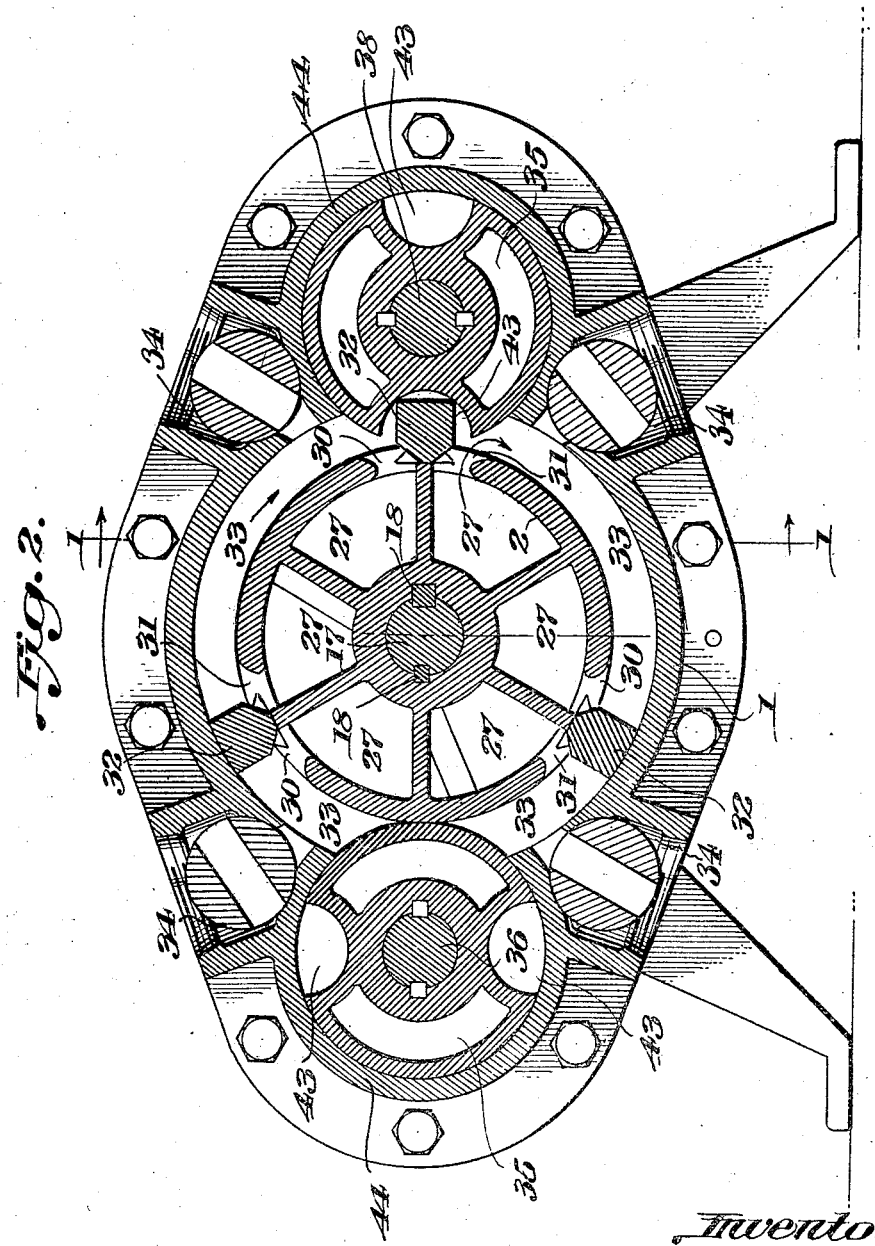
Fig. 2 is a cross section on the line 2—2 of Fig. 1.
Figure 3:
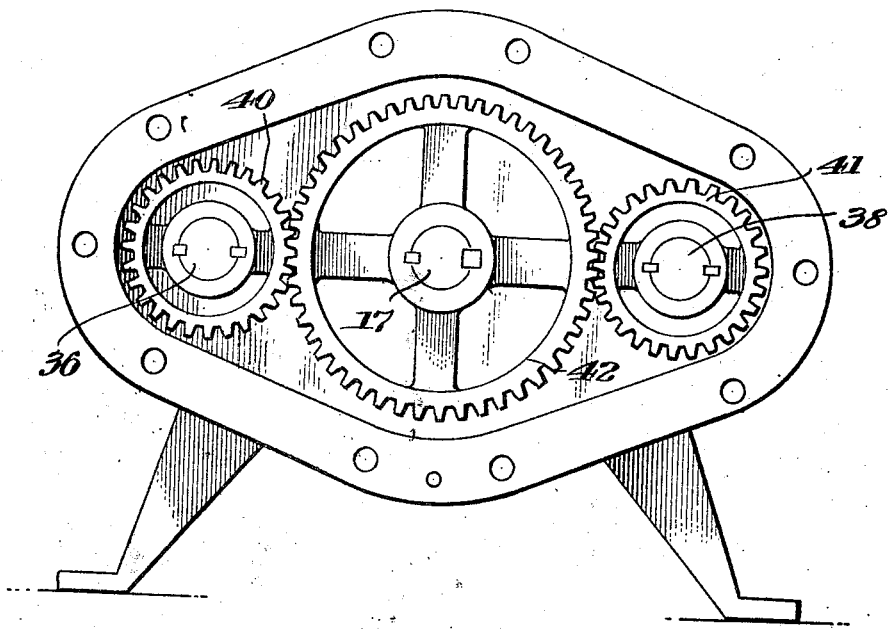
Fig. 3 is an end elevation of the case for the timing gears taken on the line 3—3, Fig. 1.

There are four abutment drums 35 of which two appear in Fig. 2. Two of the abutment drums 35 are combined with each of the rotors 2. Two of the abutment drums 35 are carried by a shaft 36 journaled in bearings 37. The remaining two abutment drums 35 are carried by a shaft 38 journaled in bearings 39. As shown in Fig. 3, the shafts 36 and 38 carry gears 40, 41, which mesh with a gear 42 secured to the shaft 17. The gearing thus provided affords perfect timing as between the rotors and the abutment drums.

The abutment drums 35 are each provided with a pair of diametrically opposite pockets 43 and, as regards a given rotor, as shown in Fig. 2, the pockets 43 of one drum 35 are arranged at right angles to the pockets 43 of the remaining drum 35 cooperating with the vanes of the given rotor.

The vanes 32 are adapted to enter the pockets 43 as illustrated in Fig. 2, or, the abutment drums contact with the vanes of the rotor to close the cavities 33.

The drums 35 revolve in shells, casings, or cylinders 44.

Steam is admitted to the center diaphragm or chest 3 or to the end diaphragms or chests 9, 10, according to the direction of rotation desired to be imparted to shaft 17.

When steam enters the cavity, then at its smallest size, it applies itself directly against the vane 32 which is the only movable surface in the cavity. The steam intake continues in the cavity for one-sixth of the revolution of the rotor, or until the cavity is half full of steam at boiler pressure. Just at this time, steam starts to enter a new cavity on the diametrically opposite side of the rotor case or cylinder 1 and a like operation takes place.

This operation takes place against each vane 32 after passing through the pocket 43 in the abutment drum 35 and, consequently, there are six impulses in each rotor cylinder during the revolution or twelve impulses during one revolution of the engine.

Each cavity having been half filled with steam at boiler pressure and then positively closed, the movement of the rotor continues and the cavity is extended to its full size, the steam then being used expansively.

The two exhaust ports 34 nearest the point of steam intake (determined by the direction the rotor is revolving) are closed and the actual exhaust takes place at a point as far as possible from the point of steam intake and as close as possible to the point where the rotor vane will engage the pocket 43.

It having been seen that to fill the cavity half full of steam at boiler pressure, it is necessary to have the intake cover a period of one-sixth of the circumference of the rotor.

Packing rings 45 seal the ends of the rotors so that the steam cannot escape or pass except through the predetermined passages hereinbefore described.

I claim:

1. In a rotary engine, the combination with a rotor cylinder, having exhaust ports and provided with intake ports at its ends or heads, of a rotor in said cylinder which is provided with a plurality of interior compartments circularly arranged in relation to the axis of the rotor, each open at one end and closed at the other end, the open and closed ends being arranged in alternation at each end of the rotor, ports being provided in the periphery of the rotor which afford communication between the compartments and the cylinder, fixed vanes carried by the rotor between the outlet ports of adjacent compartments of said rotor, and independent steam chests having ports adapted for admitting steam to the compartments at opposite ends of the rotor, said steam chests being adapted for independent use to determine the direction of revolution of the rotor.

2. In a rotary engine, the combination with rotor cylinders having exhaust ports and provided with intake ports at their ends or heads, of rotors in said cylinders each of which is provided with a plurality of compartments circularly arranged in relation to the axes of the respective rotors, each open at one end and closed at the other end, the open and closed ends being arranged in alternation at each end of the rotors, ports being provided in the rotors which afford communication between the compartments and the cylinders, vanes carried by the rotors, said rotors being coupled and mounted to revolve as a unit, a steam chest located between the rotor cylinders and adapted to supply steam to the compartments of the rotors through the intake ports in said cylinders, for the purpose of revolving the rotors in one direction, and other steam chests disposed beyond the cylinders on the opposite sides thereof from the aforesaid steam chest adapted to supply steam to the rotors through the intake ports in the other ends of the cylinders for the purpose of revolving said rotors in the opposite direction.

3. In a rotary engine, the combination with a rotor cylinder, having exhaust ports in its periphery and provided with intake ports at its ends or heads, of a rotor in said cylinder and concentric thereto which is provided with a plurality of interior compartments disposed in succession in circular arrangement, each open at one end and closed at the other end, the open and closed ends of successive compartments being arranged in alternation at each end of the rotor, ports being provided in the periphery of the rotor which afford communication between each of the compartments and the cylinder, vanes carried by said rotor, independent steam chests having ports adapted for admitting steam to the open ends of the compartments at opposite ends of the rotor, said steam chests being adapted for independent use to determine the direction of revolution of the rotor, rotary abutment drums having pockets adapted to receive the vanes, and means for timing the rotation of said rotary abutments in relation to the rotor.

4. In a rotary engine, the combination with a rotor cylinder, having exhaust ports in its periphery and provided with intake ports at its ends or heads, of a rotor in said cylinder and concentric thereto which is provided with a plurality of compartments disposed in succession in circular arrangement, each open at one end and closed at the other end, the open and closed ends of successive compartments being arranged in alternation at each end of the rotor, ports being provided in the periphery of the rotor which afford communication between each of the compartments and the cylinder, fixed vanes carried by the rotor between the outlet ports of adjacent compartments of said rotor, independent steam chests having ports adapted for admitting steam to the open ends of the compartments at opposite ends of the rotor, said steam chests being adapted for independent use to determine the direction of revolution of the rotor, rotary abutment drums having pockets adapted to receive the vanes, and means for timing the rotation of said rotary abutments in relation to the rotor.

In testimony whereof I affix my signature.

ORA MacNEILL,
*Executrix of the Estate of Paul H. MacNeill, deceased.*